United States Patent [19]

Ziglinski

[11] Patent Number: 4,753,030
[45] Date of Patent: Jun. 28, 1988

[54] FISHING WEIGHT

[76] Inventor: Mark Ziglinski, 9244 N. Leonard, Portland, Oreg. 97203

[21] Appl. No.: 859,139

[22] Filed: Apr. 30, 1986

[51] Int. Cl.$^4$ .............................................. A01K 83/00
[52] U.S. Cl. ................................... 43/42.53; 43/43.12
[58] Field of Search .................. 43/43.1, 43.12, 44.89, 43/42.53, 42.49; 29/458, 505; 264/271.1, 274

[56] References Cited

U.S. PATENT DOCUMENTS

| | | | |
|---|---|---|---|
| 2,768,468 | 9/1956 | Kibler | 43/43.12 |
| 3,514,358 | 5/1970 | Monaghan | 43/42.53 |
| 3,541,720 | 11/1970 | Buffet | 43/43.12 |
| 3,648,398 | 3/1972 | Newell | 43/43.12 |
| 3,670,447 | 6/1972 | Wohead | 43/43.14 |
| 3,744,177 | 7/1973 | Cron | 43/43.12 |
| 3,778,871 | 12/1973 | Ratte | 43/42.53 |

FOREIGN PATENT DOCUMENTS

| | | | |
|---|---|---|---|
| 535091 | 1/1957 | Canada | 43/43.1 |
| 14948 | 8/1905 | Norway | 43/43.1 |

Primary Examiner—Nicholas P. Godici
Assistant Examiner—Karen Skillman
Attorney, Agent, or Firm—Dellett, Smith-Hill and Bedell

[57] ABSTRACT

A fishing weight, particularly for steelhead fishing, is made from a tube of thermoplastic material having at least one weight element therein. Heat is applied to one end of the tube of thermoplastic material so as to form a gob of molten thermoplastic material at that end. The periphery of an attachment ring is brought into contact with the gob of molten thermoplastic material. The molten thermoplastic material flows about the ring and through the opening of the ring, and is then allowed to cool and solidify.

13 Claims, 1 Drawing Sheet

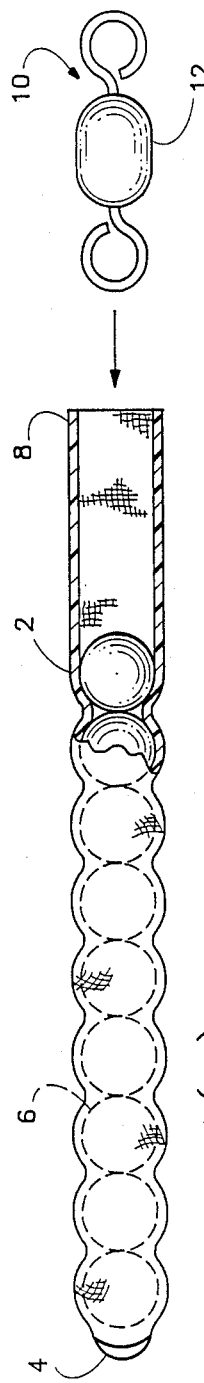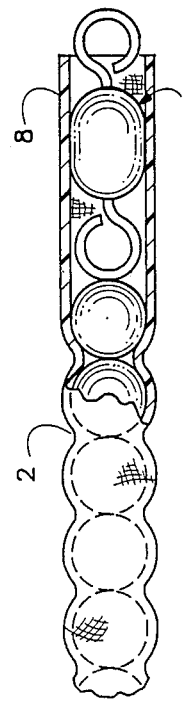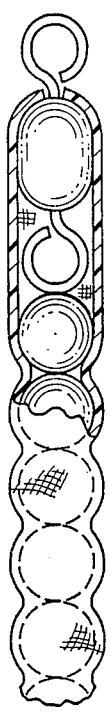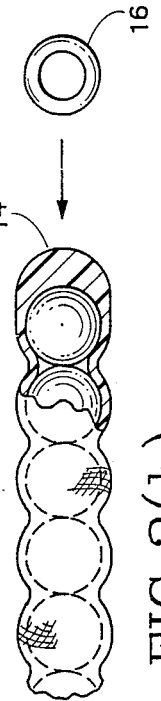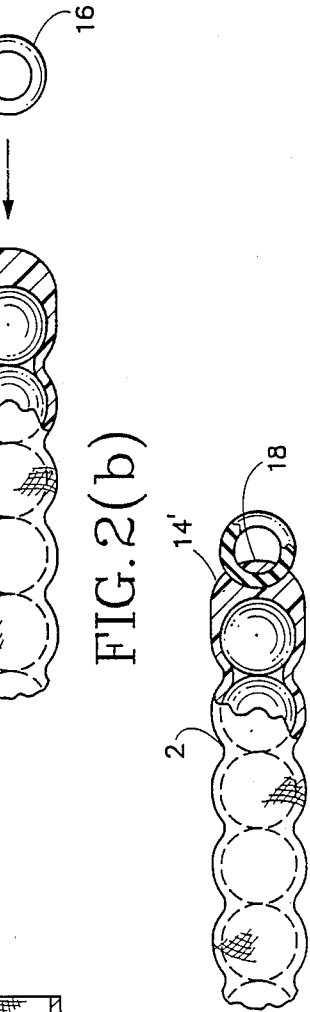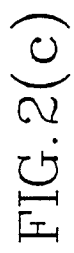

FISHING WEIGHT

This invention relates to a fishing weight.

BACKGROUND OF THE INVENTION

In fishing for certain varieties of fish, such as steelhead, it is conventional to employ a weight that is attached to the fishing line, e.g. of 6 pound test or higher, by a swivel and is used to keep the lure close to the bottom of the river or stream. The weight itself lies on the bottom of the river. If the bottom of the river is rocky, it is quite likely that the weight will become caught among the rocks, and it might not be possible to dislodge the weight. The usual result is that the fishing line is broken between the swivel and the reel, and the weight, swivel and lure are lost.

One type of weight that is used in steelhead fishing is shown in FIG. 1. This weight is made from a sleeve 2 of woven nylon fabric. It is conventional to employ a short length of parachute cord, with the cotton core removed, as the sleeve. The sleeve is closed at one end 4 by heating and thus fusing the fibers of the fabric together, and lead shot 6 is then introduced into the sleeve by way of the other, open end 8. When sufficient shot has been introduced into the sleeve, a swivel 10 is inserted into the open end of the sleeve so that the barrel 12 of the swivel is inside the sleeve. The end 8 of the sleeve is exposed to heat so that the fibers melt about the barrel of the swivel. The swivel is thereby firmly attached to the sleeve.

It is known to use a so-called break-away connector for attaching portions of fishing tackle together. For example, it is conventional in fishing for some varieties of fish to use a downrigger arrangement in which a heavy sinker, or cannonball, is suspended from a line and the hook is connected to a second line which is connected to the first-mentioned line by means of a break-away connector and is also connected to the fishing reel. When a fish strikes, the break-away connector is separated and the fish can then be landed independently of the cannonball. The cannonball remains connected to its line. The conventional break-away connector comprises a length of surgical tubing into which is inserted a rod.

SUMMARY OF THE INVENTION

According to a first aspect of the present invention there is provided a method of manufacturing a break-away connector, comprising applying heat to a localized region of a body of thermoplastic material so as to form a gob of molten thermoplastic material at the localized region, bringing the periphery of an attachment ring into engagement with the gob of molten thermoplastic material, whereby the molten thermoplastic material flows about the ring and through the opening of the ring, and allowing the molten thermoplastic material to cool and solidify.

According to a second aspect of the present invention there is provided a method of manufacturing a fishing weight, comprising providing a tube of thermoplastic material having at least one weight element therein, applying heat to one end of the tube of thermoplastic material so as to form a gob of molten thermoplastic material at that end, bringing the periphery of an attachment ring into contact with the gob of molten thermoplastic material whereby the molten thermoplastic material flows about the ring and through opening of the ring, and allowing the molten thermoplastic material to cool and solidify.

According to a third aspect of the present invention there is provided a break-away connector comprising a body of thermoplastic material and an attachment ring, there being fused portions of thermoplastic material extending through the opening defined by the ring.

According to a fourth aspect of the present invention there is provided a fishing weight, comprising a tube of thermoplastic material having at least one weight element therein, a ring defining an opening, and solidified portions of fused thermoplastic material extending through the opening in the ring.

BRIEF DESCRIPTION OF THE DRAWINGS

For a better understanding of the invention, and to show how the same may be carried into effect, reference will now be made, by way of example, to the accompanying drawings in which:

FIGS. 1a, b, c are a series of partial views, each partly in section and partly in elevation, illustrating how a conventional fishing weight is made, and FIGs. 2a, b, c are a similar series of views illustrating how a fishing weight embodying the present invention is made.

In the different figures, like reference numerals designate corresponding elements.

DETAILED DESCRIPTION

A fishing weight embodying the invention may be made from a sleeve 2 of woven nylon, such as the outer covering of parachute cord. The sleeve 2 is closed at one end (not shown) by application of heat to melt the nylon fibers together, and lead shot 6 is inserted into the sleeve way of its other, still open end 8. When sufficient shot has been inserted into the sleeve, heat is applied to the open end of the sleeve and the fibers of nylon are melted together and form a gob 14 of molten nylon. A rubber O-ring 16 is brought into contact with the gob of molten nylon, and contacts the gob of nylon at its periphery. The direction in which the O-ring is presented towards the gob of nylon is substantially perpendicular to the central axis of the O-ring. When the O-ring is pressed into the gob of molten nylon, the nylon flows about the O-ring and molten nylon passes through the opening defined by the O-ring. The nylon O-ring is allowed to cool and forms a solid body 14' including a link 18 that extends through the opening of the O-ring. The O-ring is thus captured in the solid body 14' and is attached to the sleeve 2.

If the FIG. 2 fishing weight is attached to a fishing line and becomes snagged among rocks, tension applied to the fishing line will rupture the link 18, releasing the O-ring from the solid body 4', upon application of a force that is less than that which is necessary to break a 6 pound test fishing line.

It will be appreciated that the present invention is not restricted to the particular embodiment that has been described with reference to FIG. 2 of the drawings, and that variations may be made therein without departing from the scope of the invention as defined in the appended claims and equivalents thereof.

I claim:

1. A method of manufacturing a fishing weight, comprising the following steps in the order stated:
    providing a tube of thermoplastic material for receiving at least one weight element, applying heat to one end of the tube of thermoplastic material so as to form a gob of molten thermoplastic material at that end, bringing the periphery of an attachment ring into contact with the gob of molten thermoplastic material whereby the molten thermoplastic material flows about the ring and through opening of the ring, and allowing the molten thermoplastic material to cool and solidify.

2. A method according to claim 1, wherein said tube is a fabric tube formed from woven fibers of thermoplastic material.

3. A method according to claim 1, wherein the attachment ring is an O-ring made of rubber.

4. A method according to claim 1, further comprising attaching the ring to one end of a length of fishing line such that when progressively increasing tension is applied between an opposite end of the fishing line and said tube of thermoplastic material, the thermoplastic material that has flowed through the opening of the ring and solidified breaks and releases the ring before the fishing line breaks.

5. A method according to claim 1, comprising inserting at least one weight element in the tube of thermoplastic material before applying heat to said one end of the tube.

6. A fishing weight, comprising a tube of thermoplastic material having at least one weight element therein, an attachment ring defining an opening, and portions of solid thermoplastic material at least partially through the opening in the ring.

7. A fishing weight according to claim 6, wherein said tube is a fabric tube formed from woven fibers of thermoplastic material.

8. A fishing weight according to claim 6, wherein the attachment ring is an O-ring made of rubber.

9. Fishing apparatus comprising a fabric tube formed from woven fibers of thermoplastic material and having at least one weight element therein, an O-ring defining an opening, portions of solid thermoplastic material extending at least partially through the opening in the ring, and a fishing line attached at one of two opposite ends to the O-ring, the apparatus being such that when progressively increasing tension is applied between the other of the two opposite ends of the fishing line and the fabric tube, the portions of solid thermoplastic material extending at least partially through the opening in the ring separate and release the ring before the fishing line breaks.

10. Apparatus according to claim 9, wherein the portions of solid thermoplastic material are integral with the fabric tube and are formed by fusing the thermoplastic material of the tube and allowing it to solidify.

11. Apparatus according to claim 10, wherein said portions of thermoplastic material extend fully through the opening defined by the ring.

12. A fishing weight according to claim 6, wherein the thermoplastic matrial of said portions extending at least partially through said opening is the same as the thermoplastic material of said tube and is unitary therewith.

13. A fishing weight according to claim 12, wherein said portions of thermoplastic material extend fully through the opening defined by the ring.

* * * * *

UNITED STATES PATENT AND TRADEMARK OFFICE
CERTIFICATE OF CORRECTION

PATENT NO. : 4,753,030
DATED : June 28, 1988
INVENTOR(S) : Mark Ziglinski

It is certified that error appears in the above-identified patent and that said Letters Patent is hereby corrected as shown below:

Column 2, line 55, "4'" should be --14'--.

Column 3, line 33, (claim 6, line 4), after "material" insert --extending--.

Column 4, line 27, "matrial" should be --material--.

Signed and Sealed this

Third Day of January, 1989

*Attest:*

DONALD J. QUIGG

*Attesting Officer*      *Commissioner of Patents and Trademarks*